United States Patent [19]

Steinhage

[11] 4,245,217
[45] Jan. 13, 1981

[54] PASSIVE INFRARED ALARM DEVICE

[75] Inventor: Peter-Wilhelm Steinhage, Wiesbaden, Fed. Rep. of Germany

[73] Assignee: Heimann GmbH, Wiesbaden, Fed. Rep. of Germany

[21] Appl. No.: 924,163

[22] Filed: Jul. 13, 1978

[30] Foreign Application Priority Data

Jul. 28, 1977 [DE] Fed. Rep. of Germany ....... 2734157

[51] Int. Cl.³ .......................... G08B 13/18; G02B 5/20
[52] U.S. Cl. .................................... 340/555; 250/352; 250/510; 350/1.6; 350/290
[58] Field of Search .................. 340/552, 555, 556; 350/1.6, 290; 250/339, 340, 347, 352, 353, 510, 346

[56] References Cited

U.S. PATENT DOCUMENTS

| Re. 29,082 | 12/1976 | Schwarz ............................... 340/555 |
| 3,473,864 | 10/1969 | Garbuny ........................... 350/290 X |
| 3,766,080 | 10/1973 | Swinehart et al. .................... 250/510 |
| 4,087,689 | 5/1978 | Asawa ................................ 250/347 |

FOREIGN PATENT DOCUMENTS 2103909 11/1976 Fed. Rep. of Germany .
1335410 10/1973 United Kingdom .

Primary Examiner—John W. Caldwell, Sr.
Assistant Examiner—Joseph E. Nowicki
Attorney, Agent, or Firm—Hill, Van Santen, Steadman, Chiara & Simpson

[57] ABSTRACT

A passive infrared alarm device evaluates the changes in infrared radiation level of a monitored room or a monitored portion of a room for alarm purposes. In accordance with the invention, an infrared sensing element is employed toward which an optical reflector directs infrared radiation emanating from one or more angles in a room to be monitored. An infrared filter is mounted in the path of the reflected infrared radiation before such radiation reaches the sensing element. The infrared filter is designed to absorb infrared radiation below a predetermined minimum wavelength, and additional means is provided for partially absorbing infrared radiation below the predetermined minimum at the reflector.

15 Claims, 4 Drawing Figures

PASSIVE INFRARED ALARM DEVICE

BACKGROUND OF THE INVENTION

The present invention relates to a passive infrared alarm device comprising an infrared radiation detector, an optical device which directs the infrared radiation from one or more than one angle which is to be monitored towards the detector, an analysis device which processes an output signal supplied by the detector and possibly triggers an alarm signal, and a radiation filter which is located in front of the detector and withholds undesired radiation from the detector up to a limit wavelength.

A passive infrared alarm device of this kind is known and described, for example, in British Pat. No. 1,335,410 (German As No. 21 03 909). As a passive motion alarm, it is based on the principle of recording the characteristic radiation of a room or monitored sections of a room and analyzing any changes in the recorded value as significant of the entry of a person into the monitored room for alarm purposes. For example, an analysis device of this type responds to a change in the infrared radiation with the frequency 0.2 to 5 Hz. This selected frequency range allows differentiation between a change in radiation produced by a person entering or leaving the monitored room and a change in radiation caused, for example, by temperature changes in the room or in the environment.

The advantage of a passive alarm device consists mainly in that no active signal from a monitoring device is present and, therefore, does not produce the possibility of discovery.

The radiation of the room or of monitored sections of the room is focused via an optical device onto an element—the infrared radiation detector—which responds to infrared radiation. This can be carried out via a lens system or via appropriately shaped reflectors or via a combination of the two. A radiation filter is arranged prior to the detector. The radiation filter is to prevent false alarms triggered by reflected sunlight or by other light sources such as, for example, incandescent lamps and fluorescent lamps. It transmits radiation with a wavelength from approximately 4.5 $\mu$m to 20 $\mu$m and screens other radiation from the detector. As window panes are only permeable to beams of up to a maximum of 4 $\mu$m wavelength, beams entering through the window panes from outside of the enclosed, monitored room are withheld from the detector. The radiation filter is constructed by providing a detector input window with a germanium layer upon which a thin layer of dielectric material is vapor deposited. This thin layer reflects radiation up to a limit wavelength of approximately 7 $\mu$m for the main part. However, a part thereof is absorbed in the dielectric itself and transmitted to the germanium where it is absorbed. Germanium itself absorbs electromagnetic radiation of up to 1.8 $\mu$ wavelength. As a result of the absorption, the detector input window is heated and can itself trigger an alarm as a result of characteristic radiation. Therefore, an obviously unintended alarm can be triggered by strong light sources such as car headlights and sunshine passing through the window panes of the monitored room.

SUMMARY OF THE INVENTION

The object of the present invention is to provide a passive infrared alarm device which is substantially free of false alarms and in particular responds only to processes within the monitored room. Possible alarm sources outside the monitored room are entirely eliminated.

For the realization of this aim, it is proposed in accordance with the present invention that in order to prevent heating of the radiation filter which could trigger a false alarm, a further filter device be provided in the beam path prior to the radiation filter, which device filters out beams up to the wavelength limit of the radiation filter—at least up to 1.8 $\mu$m as the wavelength limit of germanium—and withholds these from the radiation filter.

In a preferred embodiment of the present invention, the optical focusing device contains reflective elements such as, for example, concave reflectors. In this case, it is proposed that the reflective elements be provided with a coating which largely absorbs the beams below the wavelength limit of the radiation filter and transmits beams having a wavelength above the wavelength limit to the associated reflective surface. The coating can also be contrived to be such that beams having a wavelength above the wavelength limit are partially reflected and partially transmitted to the reflective surface bearing the coating. The transmitted component then passes twice through the coating and unites with the component reflected by the coating surface to form an overall useful radiation. The coating can consist of germanium or lead sulphide.

Fundamentally, this forms one possibility of withholding the undesired beams from the actual radiation filter by means of selective absorption prior to a focusing reflection.

A different embodiment, employing focusing with reflective elements, includes first carrying out a selective reflection and then either absorbing the undesired beams or forwarding these so that they are harmless to the actual radiation filter. For this purpose, in another embodiment, it is proposed that the reflective elements consist of a carrier having a selectively reflective layer, which layer reflects beams above the wavelength limit of the radiation filter, and transmits beams below into the carrier, and that in the carrier these transmitted beams are either absorbed or transmitted onwards.

In a still further embodiment, the carrier possesses, in addition to the selectively reflective layer, an absorption layer in which the beams below the wavelength limit which are transmitted by the selectively reflective layer are absorbed.

A passive infrared alarm device constructed in accordance with the present invention ensures that no radiation lying below the wavelength range provided for the infrared detector can trigger an alarm. This applies not only to light sources within the monitored room, but also, in particular, to those outside of the monitored room, such as sun or headlights which constitute strong light sources which influence the light conditions inside the room through the window panes.

BRIEF DESCRIPTION OF THE DRAWINGS

The invention will be explained in detail making reference to the Figures of the drawing, in which FIG. 1 schematically illustrates the construction of an alarm device in accordance with the invention in which for example, two room angles are monitored, and wherein a focusing device directs the unabsorbed beam component towards a detector via selective absorption and reflection.

DESCRIPTION OF THE PREFERRED EMBODIMENTS

Figure 1:
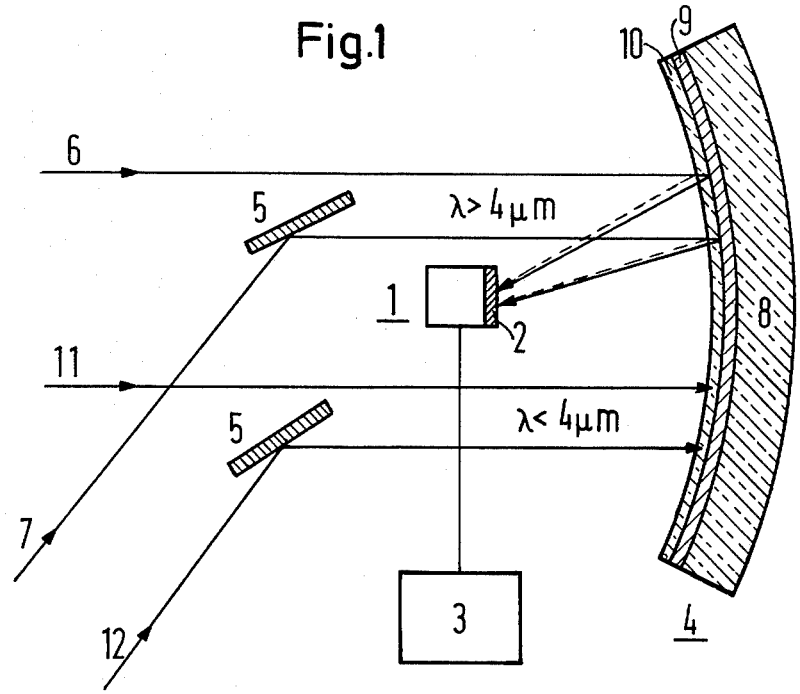

The fundamental sectional diagram in FIG. 1 illustrates an infrared radiation detector 1 as receiver for thermal radiation, comprising an input window which serves as radiation filter 2, and consists, for example, of germanium having a coating of a dielectric material. This material has a filter characteristic which is such that light beams having wavelengths of above 4 $\mu$m are transmitted and those having a wavelength of below 4 $\mu$m are reflected and absorbed. The material consists of a layer of combined dielectrics having different coefficients of refraction, composed, for example of MgO and ZnS. In dependence upon the strength of the oncoming infrared radiation, the detector 1 supplies an electric output signal which is processed in an analysis device 3 to form a possible alarm signal. The analysis is carried out, for example, as disclosed in British Pat. No. 1,335,410 and corresponding German AS No. 21 03 909.

The radiation filter 2 faces away from the beams incoming into the alarm device. These beams are focused by a concave reflector 4 arranged behind the detector 1 onto this radiation filter 2. Reflectors 5 arranged in front of the detector 1 ensure that not only the beams 6 incoming in parallel form from the angle of the room around the optical axis are focused onto the detector 1, but also the beams 7 incoming in parallel from a different angle of the room depending upon the positioning of the reflector. In this way, any angle of the room can be monitored.

The concave reflector 4 consists of a carrier 8 consisting of metal, glass or ceramic, of a reflective; metallic layer 9 arranged thereupon, and of a selectively absorbent coating 10 arranged thereupon. In the drawing the carrier 8 has been shown as consisting, for example, of glass.

The coating 10 absorbs oncoming beams 11, 12—11 in parallel with 6 and 12 in parallel with 7—with a wavelength of below 4 $\mu$m, and consists, for example, of lead sulphide. As a result, only beams having a wavelength of above 4 $\mu$m reach the reflective layer 9 and are directed towards the detector 1. Thus, the radiation filter 2 is unable to receive beams from light sources which could trigger false alarms as a result of the heating of the radiation filter 2. Advantageously, the limit wavelength of the overall radiation filter—in this case 4 $\mu$m—is taken into account. It would also be possible to disregard the possible heating of the dielectric layer of the radiation filter 2 and to aim only to prevent heating due to absorption in the germanium layer of the radiation filter 2. Then the coating 10 would only have to be aligned to 1.8 $\mu$m as the critical wavelength of germanium and could consist, for example, of germanium.

A variant is shown in broken lines in FIG. 1. The coating 10 can be contrived to be such, when it consists, for example, of quartz, that the beams above 4 $\mu$m are already partially reflected. The other part is then transmitted through the coating 10 and reflected by the reflective layer 9.

Figure 2:
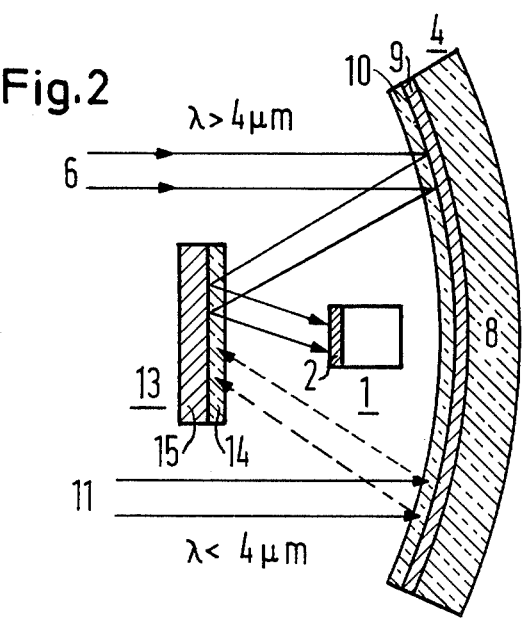
FIG. 2 illustrates a variant of the focusing device in the form of a so-called folded optics with a shortened structural length.

FIG. 2 illustrates a design in which a so-called folded optics is used in order to shorten the structural length.

As in FIG. 1, a concave reflector 4 consists of a carrier 8, this time composed of metal such as, for example, A1, and of a layer 9 bearing a coating 10. The beams 6 above 4 $\mu$m which are incoming in parallel in this example from only one single angle of the room are reflected by the layer 9 of the concave reflector 4 and thrown back onto a plane reflector 13. This again carries out a reflection and directs the beams 6 onto the detector 1, of which the input window, acting as radiation filter 2, in this case faces towards the direction of the originally incoming beams 6. The plane reflector 13 advantageously likewise bears a selective absorption layer 14 on the reflective layer 15 which, for example, itself forms the metallic carrier. This ensures the complete absorption of beams 11 above 4 $\mu$m which are not entirely absorbed in the selectively absorbent layer 10 of the concave reflector 4 and have been reflected on the layer 9.

Figure 3:
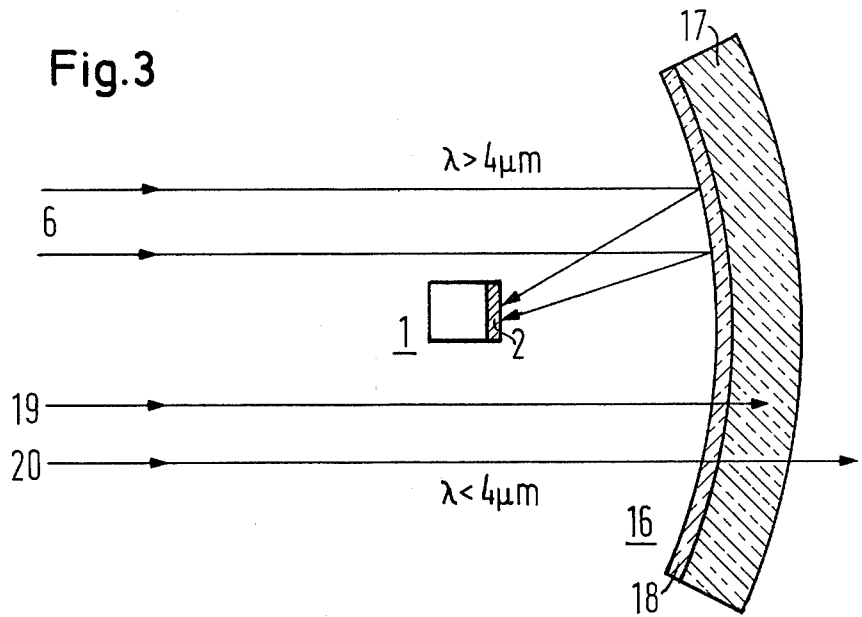
FIGS. 3 and 4 illustrate a focusing device wherein a reflective element bears a selectively reflective layer and in FIG. 4 an absorbent layer is arranged beneath.
Figure 4:
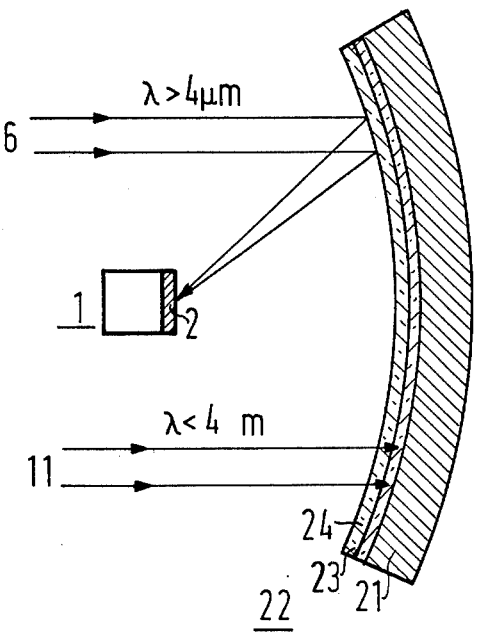

FIGS. 3 and 4 illustrate a fundamental design in which it is not a question of carrying out selective absorption followed by reflection, but of carrying out selective reflection followed by an optional absorption.

FIG. 3 again illustrates a concave reflector 16 wherein a carrier 7 bears a selectively reflective layer 18 consisting, for example, of quartz. Beams 6 above 4 $\mu$m are reflected on the reflective layer 18 and directed towards a detector 1, whereas beams 19, 20 below 4 $\mu$m are transmitted into the carrier 17. This carrier 17 consists, for example, of glass and forwards the beams 20, or else consists of a material such as, for example, PVC or another synthetic and absorbs the beams 19.

FIG. 4 illustrates a variant of the principle of selective reflection which is suitable for the metallic concave reflector carrier 21 of a concave reflector 22. The detector 1 is as in FIG. 3. A carrier 21 bears on absorption layer 23 followed by a selectively reflective layer 24 again consisting, for example, of quartz. The beams below 4 $\mu$m transmitted from this layer 24 are absorbed in the absorption layer 23 and rendered harmless.

It will be apparent to those skilled in the art that many variations and modifications may be made without departing from the spirit and scope of the novel concepts of the present invention.

I claim as my invention:

1. Passive infrared alarm device, containing:
   (a) an infrared radiation detector;
   (b) an optical device with at least one reflecting element, which directs the infrared radiation from one or several room angles to be monitored onto the detector;
   (c) an evaluating device, which processes an output signal delivered by the detector and, where applicable, releases an alarm signal;
   (d) a radiation filter which is placed between the optical device and detector, which radiation filter keeps undesired radiation up to a critical boundary wavelength away from the detector; characterized by the feature;
   (e) said reflecting element having a reflecting surface area and including filter means for the prevention of a heating of said radiation filter by keeping rays up to its critical boundary wavelength away from it.

2. Alarm device according to claim 1, characterized in that said reflecting element for the purpose of selective absorption, bears a coating, which predominantly absorbs rays under the critical boundary wavelength of the radiation filter, and which transmits rays with a wave length above the critical boundary wave length to the pertaining reflecting surface area.

3. Alarm device according to claim 2, characterized in that only a part of the rays with a wave length above the critical boundary wave length is transmitted to said pertaining surface area, while another part is already reflected.

4. Alarm device according to claim 1, characterized in that said reflecting element, for the selective reflection, is formed out of a carrier with a selectively reflecting layer, which reflects rays above said critical boundary wave length of said radiation filter, and transmits rays under this critical boundary wave length.

5. Alarm device according to claim 4, characterized in that said carrier absorbs said transmitted rays.

6. Alarm device according to claim 4, characterized in that said carrier transmits the transmitted rays further.

7. Alarm device according to claim 4, characterized in that, under said selectively reflecting layer, there lies an absorption layer, which absorbs the transmitted rays.

8. Alarm device according to claim 2, characterized in that said coating consists of germanium.

9. Alarm device according to claim 2, characterized in that said coating consists of lead sulfide.

10. Alarm device according to claim 7, characterized in that said absorption layer consists of germanium.

11. Alarm device according to claim 7, characterized in that said absorption layer consists of lead sulfide.

12. Alarm device according to claim 4, characterized in that said selectively reflecting layer consists of quartz.

13. Alarm device according to claim 5, characterized in that said selectively reflecting layer consists of quartz.

14. Alarm device according to claim 6, characterized in that said selectively reflecting layer consists of quartz.

15. Alarm device according to claim 7, characterized in that said selectively reflecting layer consists of quartz.

* * * * *